United States Patent [19]
Bernstein

[11] 3,783,172
[45] Jan. 1, 1974

[54] RADAR SIMULATOR
[75] Inventor: Frank H. Bernstein, Baltimore, Md.
[73] Assignee: The Singer Company, Binghamton, N.Y.
[22] Filed: July 21, 1971
[21] Appl. No.: 164,749

[52] U.S. Cl. ............................................... 35/10.4
[51] Int. Cl. ............................................. G09b 9/00
[58] Field of Search ...................................... 35/10.4

[56] References Cited
UNITED STATES PATENTS
3,571,479   3/1971   Horattas et al. ...................... 35/10.4

Primary Examiner—T. H. Tubbesing
Attorney—William Grobman and Andrew L. Bain

[57] ABSTRACT

A device for simulating radar targets comprises a general-purpose digital computer and a special interface which generates suitable video signals in response to the computer outputs to drive a radar set. In a radar simulator in which several different types of radar targets are simulated, the apparatus of this invention is used to generate the video signals which will display a plurality of mobile targets on the radar set. A limited number of such targets are displayed, and the characteristics of these targets are entered into the computer. Information representing the initial locations of the selected targets and their directions and speeds of movement is inserted into the computer from a remote station, and the computer performs the necessary navigational computations to continually determine the location of the radar set in the gaming area, the bearing of each of the targets from the radar set, and the bearing of the radar antenna at any time. The ranges of all of the targets on a particular bearing are entered by the computer into a register in the order of increasing range from the radar set. When the simulated radar antenna bearing agrees with the target bearing, the stored target ranges are read from the register and are converted into video signals to drive the radar set.

8 Claims, 7 Drawing Figures

INVENTOR.
FRANK H. BERNSTEIN
BY
William Grobman

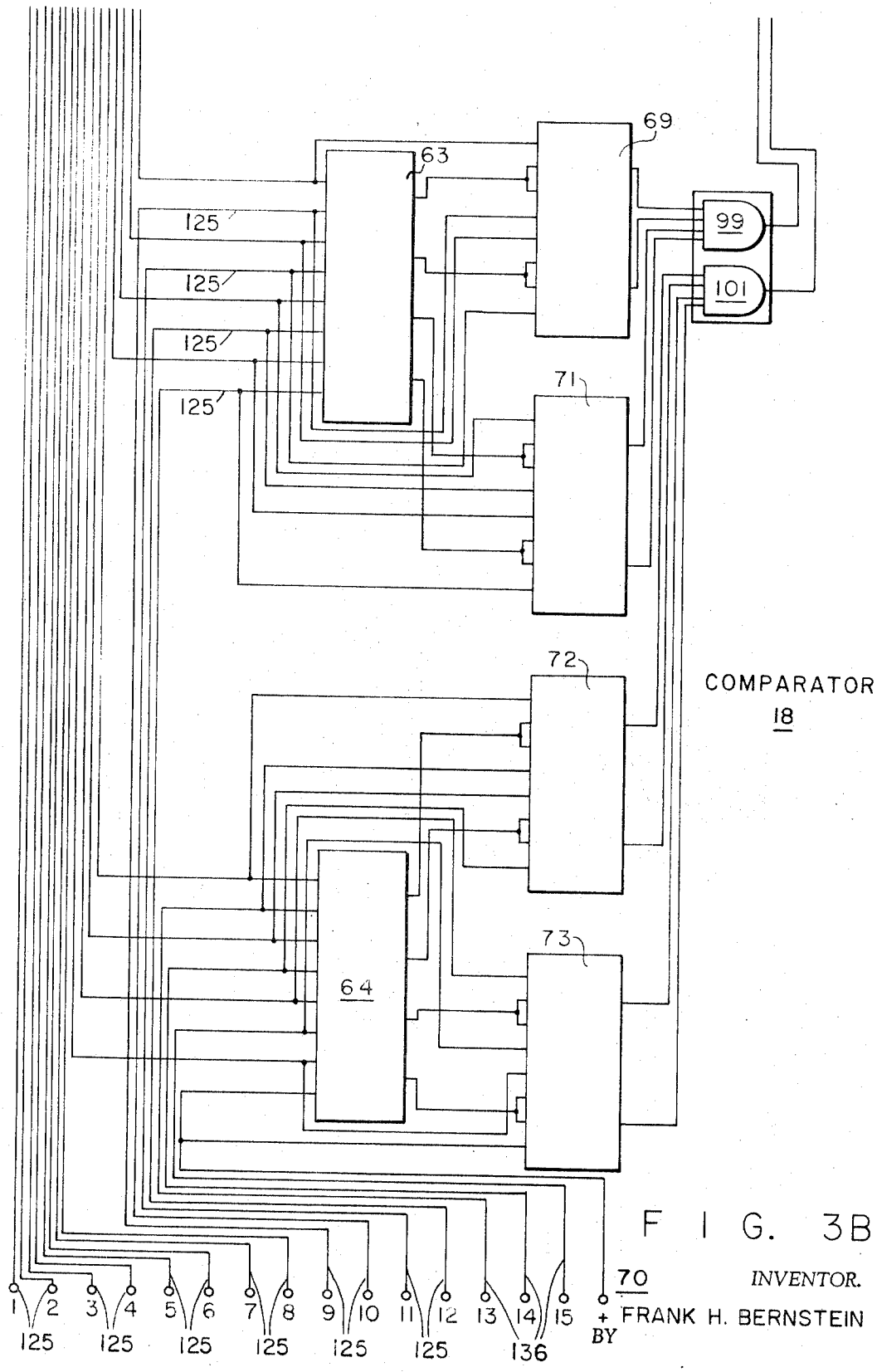

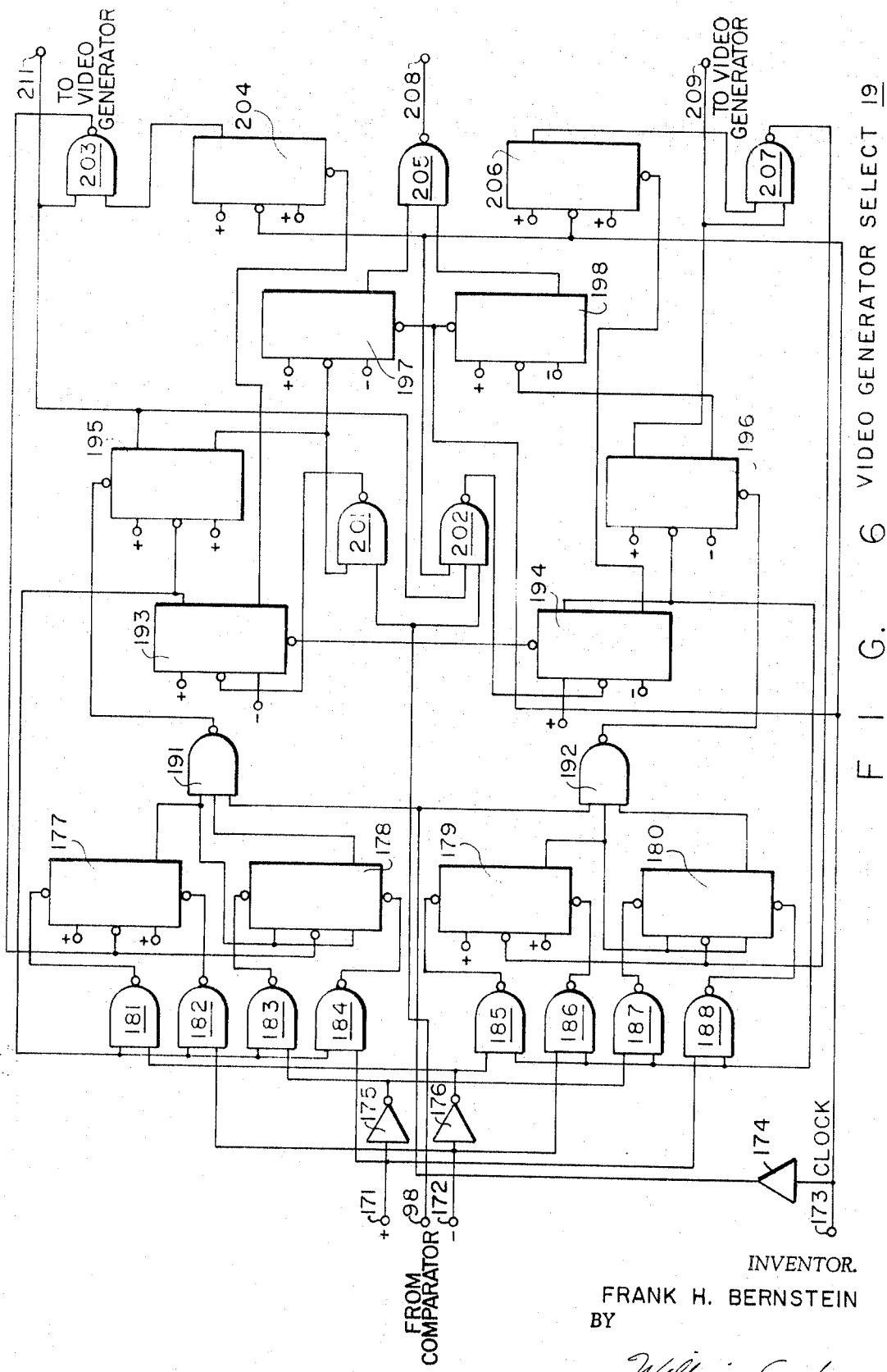

RADAR SIMULATOR

The invention herein described was made in the course of or under a contract, or subcontract thereunder, with the Department of Navy.

This invention relates to simulators, and more particularly, to devices for simulating radar systems.

Since radar first made its appearance during World War II, the problem of training personnel to utilize the equipment in an efficient and accurate manner has been present. Radar, which is a system for determining the range and bearing of an object from a radar antenna by the use of reflected radio waves, has been improved over the years. In addition, it has become more complex in that there are many different forms of radar, each designed for a particular purpose. Many of the more complex radar installations include a single radar display device which is used to display signals representing land mass, weather, and moving targets. Since, in such an installation, one type of display is superimposed upon another, the radar operators must be trained to distinguish among the various targets so represented. For this type of training, it is necessary to simulate all of the different types of radar targets found in such a composite display. For the radar trainer to be fully effective, each type of target must be capable of separate and independent control so that one type of radar display can be changed in one manner while each of the others is being changed in another manner.

Many different types of radar simulators have been developed. One of the earliest used a transparent photograph of an actual radar map which was scanned by the light of a flying spot scanner moving in the PPI sweep so that the light passing through the transparency at any moment would fall upon a photo-multiplier tube. The electrical output of the photo-multiplier tube was applied to the IF stages of a standard radar set. A subsequent radar simulator used piezoelectric crystals mounted on a rotating shaft and aimed at a model at the bottom of a liquid-filled tank to simulate the electric radar signals. The burst of sound generated by the crystal was transmitted through the liquid medium to the model and also reflected therefrom in a manner closely simulating the reflected radio signals of an actual radar transmission. The liquid was chosen so that the transmission time would approximate that of the radar system's. The reflected signals were picked up by the crystal and were converted into electrical energy. Later, movable reflectors were used to simulate changed antenna distribution patterns. The range and speed of rapidly developing aircraft soon rendered the acoustical simulators obsolete, and an optical PPI classroom trainer ws developed. This optical trainer utilized transparencies having a very large scale and representing radar reflectivity changes over the gaming area to be represented. The radar display was simulated by scanning the transparencies with a revolving diaphram which had a very narrow slit through which the light from a vapor arc lamp was passed. This light was passed through the transparencies and was projected onto the rear of a circular fluorescent screen. Subsequently, the transparencies utilized for such purposes were greatly improved, and eventually radar reflectivity maps of a very large scale and representing a large geographical area were being scanned by light sources of many types. The light which passed through these transparencies was converted into electrical energy and used to stimulate standard radar receivers.

All of the early radar simulators offered serious disadvantages. In some, the resolution of the resulting display was quite poor, others were not very realistic. In all of the early radar simulators, whether they used transparencies or three-dimensional models, the gaming areas and the programmed targets were not readily changeable. A three-dimensional model, in addition to being expensive, also was difficult to replace when a different gaming area was desired. Although the transparencies were not as difficult to inter change, they, too, were expensive to produce and each provided a single fixed format. The training value of the radar simulator which presented relatively unchangeable formats was limited. This led to the development of a marine radar trainer which utilized a digital computer, a standard radar set, and a special interface connecting the two. A gaming area could be stored in the computer memory and read out as digital information which was converted by the special interface into video signals readily accepted by the radar set. This type of radar simulator is represented by the device in U.S. Pat. No. 3,514,521, issued to Burchard et al.

The advantages of the radar simulators which utilize digital computers are clear, since these devices are easily modified to change the gaming area. In addition, movable targets may be added or deleted, may be speeded up or slowed down, may have their directions changed, or may be completely eliminated at any time by an instructor utilizing simple switching devices. In order to accommodate a number of movable targets in a radar simulator of the type represented by the Burchard et al patent, which targets are high-speed targets and in which system the radar set itself is mounted on a high-speed device, simpler interface equipment must be developed to permit the rapid changes required by such equipment.

It is an object of this invention to provide a new and improved electronic system.

It is another object of this invention to provide a new and improved simulator.

It is a further object of this invention to provide a new and improved radar simulator.

Other objects and advantages of this invention will become more apparent as the following description proceeds, which description should be considered together with the accompanying drawings, in which:

FIGS. 3A and 3B are a logical block diagram of the range comparator of FIG. 1;

FIG. 6 is a logical block diagram of the video generator select of FIG. 1.

Figure 1:
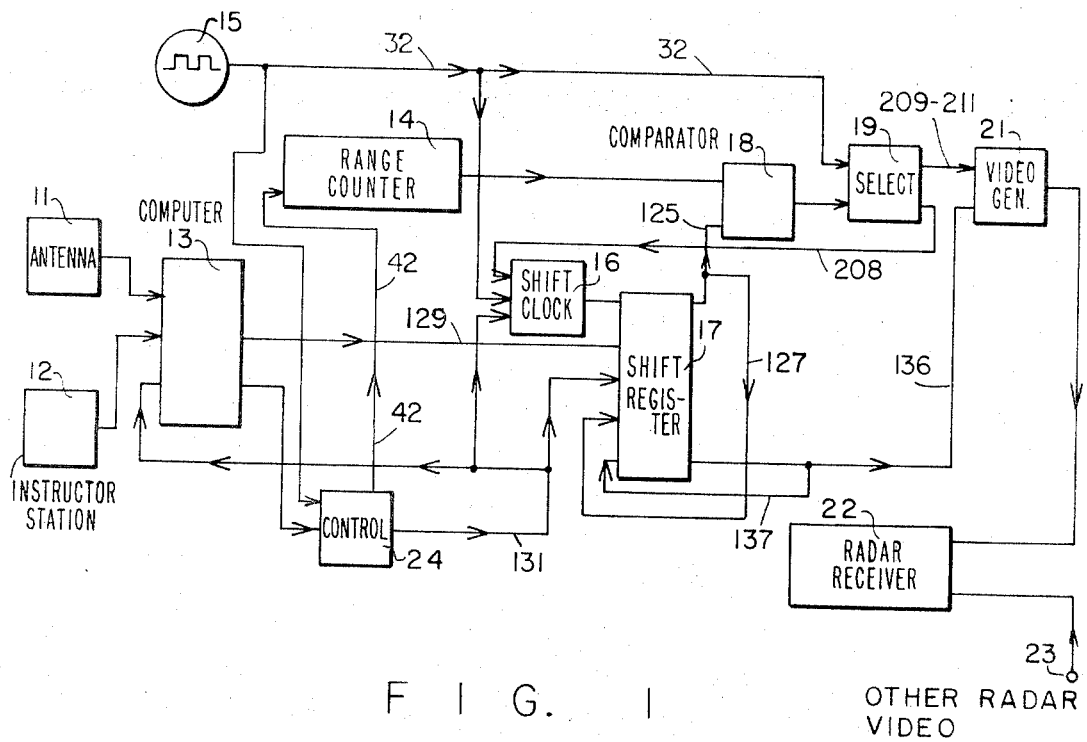
FIG. 1 is a general block diagram of a system according to the invention.

Referring now to the drawings in detail and more particularly to FIG. 1, which is a broad block diagram illustrating in generalized form the general flow of controls and information reference character 11 designates a radar antenna simulator whose output is connected to an input of a general-purpose digital computer 13. An instructor station 12 is also connected to an input of the computer 13. One output from the computer 13 is applied to the input of a data transmission control 24 which has one output connected to one input of a range counter 14. Another input to which is supplied from a clock 15. The output from the range counter 14 is applied to one input of a target range comparator 18 whose output is applied to one input of a target video select 19. The other input to the target video select 19 comes from the clock 15. One output from the target video select 19 is applied as an input to a shift register clock 16 whose output serves as one input to a target shift register 17. One output from the target shift register 17 is the second input to the target range comparator 18, and the other output from the target shift register 17 is one input to a target video generator 21 whose other input comes from the target video select 19. The output from the target video generator 21 is applied as an input to the radar receiver circuit 22 which also receives additional video signals from other apparatus applied through an input terminal 23. The shift register clock 16 also receives input signals from the clock 15 and from an output of the data transfer control 24 which is also applied as an input to the computer 13. Another output from the computer 13 is applied as a second input to the target shift register 17, and the output from the data transfer control 24 is also applied to the target shift register 17 as a third input. In addition one output from the register 17 is fed back through line 127 and another is fed back through a line 137.

The computer 13 is a general-purpose digital computer which is preprogrammed to perform standard navigational computations. For the purposes of this specification, a general-purpose digital computer is a digital computer which can be used for a multitude of purposes, both scientific and businesss in nature, and which is readily available for purchase or hire from your local computer salesman. The manner in which the computer 13 is programmed to perform its duties in immaterial to this invention. Since the particular computer program depends, at least in part, upon the computer characteristics, since any general-purpose digital computer may be used in the system of this invention, and since the computations are based upon navigational computations which are not new, the programming of the computer 13 will not be discussed. The radar reflectivity characteristics of the gaming area are stored in the computer 13. The gaming area may be, for example, a geographical area which could extend along the coast of North America for a distance of, say, 200 miles and out into the ocean for a similar distance. If desired, a substantial portion of the gaming area could extend somewhat inland in addition to the coast line itself. The manner in which this gaming area is represented is not the subject of this invention, but it can be one of the standard land mass simulator systems described above or any new such system designed for the purpose. For thus discussion, it is assumed that the video signals generated by such a system are applied to the terminal 23 for display upon radar receiver circuits 22. Although it is not important to this invention how the signals which represent the gaming area are generated, it is important that such a gaming area is represented because it is assumed for this discussion that the radar receiver circuits 22 are airborne and are carried in an aircraft flying over the gaming area. As the aircraft moves over the gaming area some movable targets come into range of the radar equipment and others leave the range of the radar equipment. The manner in which signals representing these targets are generated is discussed herein.

It is customary in a system of this nature to limit the number of targets and the types of targets which can be displayed. The movable targets to be displayed by the apparatus of this invention can be airborne targets, ocean surface targets, and, to a limited extent, ocean smorkling targets. In each of these categories, only a limited number of targets normally will be simulated. In any case, the type of target is identified, its location in the gaming area is identified, the direction and speed of its movement are identified, and this information is inserted into the computer 13 by the instructor at the instructor station 12. This information can be inserted into the computer 13 in any number of different ways. For example, the instructor station 12 can include a standard computer input keyboard upon which the instructor types the information he wishes to insert into the computer and which converts that information into a form readily accepted by the computer 13. Another way in which this information can be made available to the computer 13 is to provide the instructor station 12 with a plurality of switching devices, each of which represents a different target. The instructor uses the switching device for the individual target to supply to the computer position, bearing, and speed characteristics of that target. Means for inserting information of this type is shown in the abovementioned U.S. Pat. No. 3,514,521 to Burchard et al.

Once the information which efines the movable targets has been inserted into the computer by the instructor and the location of the radar receiver 22 has been similarly identified, the simulator begins operating. As mentioned above, the apparatus of this invention generates signals which are displayed as separate movable targets on a radar display which also receives information defining other types of targets, such a land mass, clouds, etc. The radar system of this invention, for this discussion, is considered to be airborne, although the invention is not restricted thereto. The computer 13 computes the changing location of the simulated airborne radar receiver in the gaming area. It also computes the changing positions of the simulated movable targets which had been identified by the instructor. When any of these targets are found by the computer 13 to be within the range of the radar receiver being simulated, the computer 13 compares the bearings of these targets with the continually changing antenna bearings from the antenna simulator 11. All targets which appear along any one bearing angle are arranged by the computer in the order of increasing range from the radar receiver. At the time that the continually changing bearing of the antenna simulator 11 corresponds to the bearing of these targets, the information defining these targets is transmitted to the shift register 17. In this particular example, each target is represented by 15 binary digits, 12 of which digits identify the range of the target from the radar receiver at that time and three of which digits represent the radar reflectivity level of that particular target. As used in this apparatus, the radar reflectivity level is really the intensity with which that target is displayed on the radar display. This intensity will vary from target to target, with the range of the target from the radar set and with the aspect that the target presents to the radar antenna. The information that the instructor supplies from the instructor station 12 to the computer 13 to identify the targets, can identify those targets by specifying a radar reference intensity which can be modified as a function of range. Since the location of the target in the gaming area is identified, and since the location of the radar set in the gaming area is identified, a simple computation by the computer 13 determines the range between the two. The computer arranges the targets in the order of increasing range by standard comparison and sorting techniques. The digits which represent the range and intensity of all of the targets on a single bearing will transfer from the computer 13 to the shift register 17 with the target closest to the radar set being applied to the shift register 17 first. when a simulated radar pulse is transmitted, the computer 13 sends to the range counter 14 through the control circuit 24 a signal which clears that counter to zero. The pulses from the clock 15 are continually applied to the counter 14 through the control circuit 24 and line 42 causing the counter to count. Thus, the counter 14 indicates by the value of the count stored therein at any instant, the range from the radar set at that instant to any target. The range portion of a target information is applied by the shift register 17 along lines 125 to the target range comparator 18 together with the continually changing count from the range counter 14. When the two are equal, the target range comparator 18 generates an output signal which is applied to the target video select 19 circuit. The target video select 19 circuit is a temporary storage device which permits the display of two targets which are very close together in range by temporarily storing these two targets. The output from the target video select 19 circuit is applied to the target video generator 21 to condition the generator 21 to generate video information for the duration of the transmitted radar pulse and which represents the intensity of the target from intensity information that the generator 21 receives from the shift register 17. At the same time, the target video select 19 circuit applies the signal to the shift register clock 16 which generates an output signal and applies it to the shift register 17 to cause the register 17 to shift to the next position. This makes the information describing the next target available. The video generator 21 applies its video signals to the radar receiver circuits 22 together with any other video signals which are applied from other sources to the input terminal 23. The video generator 21 may be any suitable video generator such as that shown in FIG. 2N and described in column 22 of the U.S. Pat. No. 3,514,521 issued on May 26, 1970 to W. K. Burchard et al.

The information applied to the shift register 17 is recirculated through the feedback lines 127 and 137 so that it is available for display until it is updated, (as described below) at which time the entire operation begins again with the new information. How often the information in the register 17 is updated depends upon many factors among which are the resolution desired, the computation load of the computer, rate of the radar antenna rotation being simulated, etc. As a general rule in large simulators, the computer is used to perform a wide variety of computations, of which the mobile radar target computations are but one type. Each of these types of computations must be fitted into the computer routine and the time available. In one simulator in which the radar system of this invention was included, the target information was recomputed and applied to the register 17 100 times a second. This update frequency was a compromise which fit the desired resolution, the amount of computation required, and the computer loading by the rest of the trainer. The amount of computer time required to define the mobile targets also depends upon the number of targets to be simulated. In the example used, the system is limited to no more than eight targets to be displayed along any bearing and a basic update rate of 100 Hz was used. Between updates of the target information by the computer, the information in register 17 is used and then recycled. Therefore, the same targets are displayed for at least one hundredth of a second.

Shift register 17 contains a feedback path, from the video select circuit 19 to the shift clock 16 through line 208 so that each time infomration is shifted from the shift register to the target video generator 21, a count is made of the shift. Thus, the apparatus keeps track of the number of targets which have been shifted out of the shift register 17. When the additional data from the computer 13 is applied to the shift register 17, and data transfer control 24 conditions the shift clock 16 to apply a sufficient number of clock pulses to the register 17 to ensure that the first target of the new information is shifted to the proper position and is available when needed. The clock pulses applied to the shift clock 16 come from the clock 15.

Figure 2:
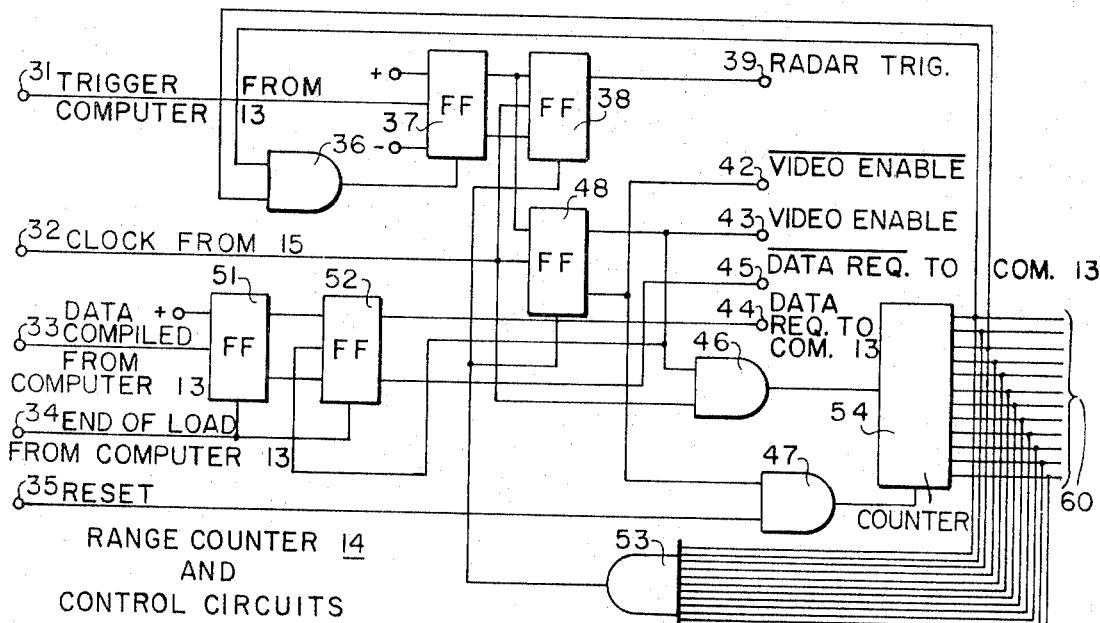
FIG. 2 is a logical block diagram of the range counter of FIG. 1; together with some control circuits

FIG. 2 shows a range counter 54 together with some of the control circuitry 24 which generates the radar trigger signals and the video enable signals. The radar trigger pulse generated by the computer 13 is applied to an input terminal 31 which connects to the clock input of a JK flip-flop 37. The set input of the flip-flop 37 has a permanent positive signal applied to it, and its set output is connected to the set input of a flip-flop 38 and to the set input of a flip-flop 48. The restore output of the flip-flop 37 is connected to the restore input of flip-flop 38. The set output of the flip-flop 38 is the Radar Trigger signal. The clock input to the flip-flop 38 is applied from a clock input terminal 32 which is connected to the clock 15 of FIG. 1. The terminal 32 also is connected as a clock input to the flip-flop 48 and as one input to an AND gate 46. The set output of the flip-flop 48 is the $\overline{\text{Video Enable}}$ signal, is applied as one input to an AND gate 46 and as the clock input to a flip-flop 52. The restore output from the flip-flop 48 is the Video Enable signal and is applied as one input to an AND gate 47. The other input to the AND gate 47 is connected to an input terminal 35 which receives the reset signal from the computer 13. The output from the gate 47 is connected to the reset input of a 15-bit range counter 54. The output from the gate 46 is applied to the counter 54 as the clock input. All of the outputs from the counter 54 are connected as inputs to an AND gate 53 whose output is connected to the clear inputs of the flip-flops 38 and 48. In addition, the first output and the third output from the counter 54 are connected as two separate inputs to an AND gate 36 whose output is applied to the clear input of the flip-flop 37. A Date Compiled signal from the computer 13 is applied to an input terminal 33 which is connected to the clock input of a flip-flop 51 whose set input has a permanent positive potential applied to it. The set output of the flip-flop 51 is applied as a set input to a flip-flop 52, and the restore output from the flip-flop 51 is connected to the restore input of the flip-flop 52. The clock input to the flip-flop 52 is connected to the set output of the flip-flop 48. The set output of flip-flop 52 is the Data Request signal and the restore output is the $\overline{\text{Data Request}}$ signal. The End of Load signal from the computer 13 is applied to an input terminal 34 which is connected to the clear inputs of the two flip-flops 51 and 52.

The circuitry shown in logic form in FIG. 2 generates the output signal from the counter 54, which is the range counter, and also provides specific control signals which are utilized in other portions of the overall system. The range counter 54 is reset to zero at the initiation of each cycle of operation. It receives clock pulses which are applied from the clock 15 to the input terminal 32 through the AND gate 46 so long as the flip-flop 48 is in its set state. When the counter 54 has reached its maximum count, all of the outputs from the counter 54 are high, all of the inputs to the gate 53 are high, and a signal passes through gate 53 to the clear input of flip-flop 48 and flip-flop 38. This causes flip-flop 48 to reset. A new trigger pulse applied to input terminal 31 signals the beginning of a new cycle of operation and also triggers the Radar CRT Beam sweep. When the trigger pulse from the computer 13 arrives at the input terminal 31, it sets flip-flop 37 which causes the next clock pulse to set flip-flops 38 and 48. When the flip-flop 48 is set, a signal is applied to gate 46 which allows passage of clock signals through that gate to the counter 54. Thus, by the combination of gate 46, and of flip-flops 37, and 48, clock pulses which are applied to the range counter 54 may be interrupted by the end of a full count and again initiated after a suitable time. Flip-flop 37 is cleared to zero when the count in the counter 54 reaches five, and its first and third output lines go high to permit the clear signal to pass through the gate 36. This causes flip-flop 38 to reset on the next clock pulse, and provides the terminal 39 with an output radar trigger signal which is synchronized to the station clock.

When the reset pulse, which precedes the beginning of a new radar bearing sweep, is applied to the input terminal 35, it passes through the gate 47 to reset the range counter 54 to zero. At the time the flip-flop 48 was restored, one signal was removed from the input of the gate 46, as mentioned above, and transmission of the clock pulses to the counter was interrupted. The computer 13, in order to provide the apparatus of this invention with sufficient information to keep it operating, must perform its navigational computations and have the information describing the indivivual targets which lie along a particular bearing available for transmission before the antenna simulator 11 reaches that bearing position. When the computer 13 has its information available, it generates a data compiled signal which is applied to the input terminal 33 and serves as a clock pulse to set the flip-flop 51. This applies a set input signal to the flip-flop 52 which receives its clock pulses when the flip-flop 48 is set. When the flip-flop 52 is set, it applies a signal to the terminal 44 which is transmitted to the computer 13 indicating to the computer 13 that the apparatus is ready to receive that data which is available. When flip-flop 48 is reset, its set output goes low providing a pulse to the clock input of the flip-flop 52, cuasing a data request signal to be transmitted to computer 13. Once the computer 13 receives the data request signal, it transmits the compiled data to the apparatus of this invention. This transmission comprises a fixed length of time which is monitored by the computer 13. At the end of the transmission of the data, the computer applies an End of Load signal to the input terminal 34. This signal clears both flip-flops 51 and 52 to their restore conditions. The restore output from the flip-flop 51 is applied to the restore input of the flip-flop 52 so that everytime the flip-flop 48 is reset it does not change the condition of the flip-flop 52. The restore output from the flip-flop 52 provides a signal on terminal 45 for the computer 13, which signal blocks the computer from transmitting any data to this apparatus until it is required. In addition to supplying a clock signal to the flip-flop 52 and to gate 46, the flip-flop 48 also applies signals to the two terminals 42 and 43 to generate the video enable signals used in other portions of this apparatus. Thus, the sequence of signals is as follows.

The computer 13 generates a trigger signal which is applied to the terminal 31. This sets flip-flop 37 and allows the generation of the Radar Trigger and the Video Enable signals when the next clock pulse arrives at terminal 32. The Reset signal applied to terminal 35 causes the counter 54 to clear to zero. This signal is applied just prior to reception of the trigger pulse from computer 13.

Figure 3A:
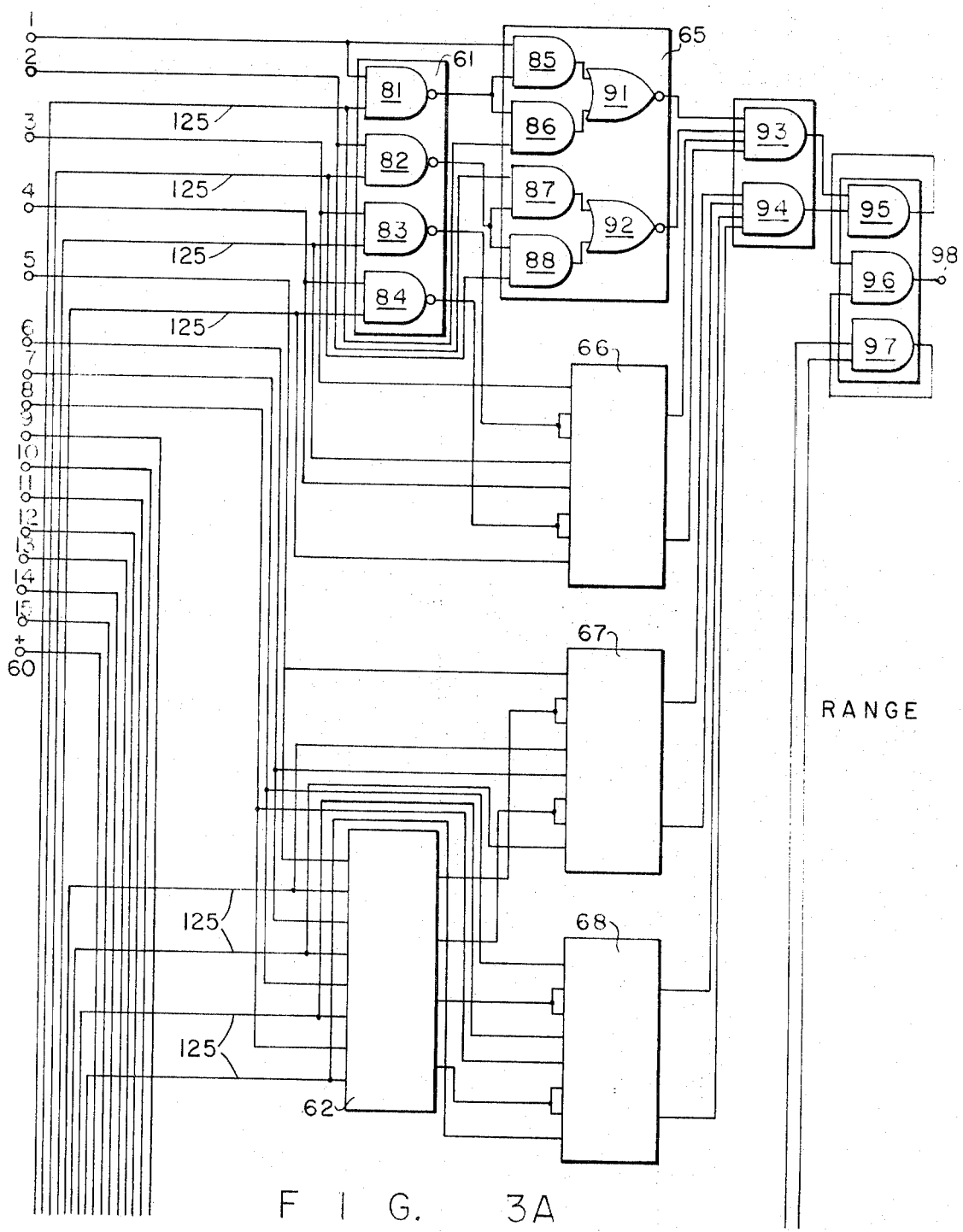

The target range comparator 18 is an important component in the system of this invention. It generates the output signal at the appropriate time when the sweep on the radar display has reached a position equilavent to the range of the targets to be displayed. Until that signal is generated, no targets are indicated. The comparator 18 has two sets of inputs, one from the range counter 14 and the other from the shift register 17. FIGS. 3A and 3B which are a block diagram of the comparator 18, have been drawn to indicate how a practical device of this nature is constructed. The comparator 18 is arranged on a single printed circuit board. Standard integrated circuit components are used. For example, integrated circuits 61, 62, 63, and 64, each of which comprises four NAND gates, such as 81, 82, 83, and 84, are used. Only the gates 81–84 in the circuit 61 are shown, but the contents of the other blocks 62, 63, and 64 are identical thereto. In addition, eight components 65, 66, 67, 68, 69, 71, 72, and 73, each of which comprises four AND gates 85, 86, 87, and 88, whose outputs are combined as inputs to NOR gates 91 and 92, are used. The outputs from the components 65–73 are combined in a series of coincidence gate circuits such as 93, 94, 99, and 101; and the outputs from these gates are further combined in coincidence gates 95, 96, and 97. The output from the gates 95 and 97 are applied to the inputs of gate 96 whose output is brought out to terminal 98. The inputs to the cmparator 18 are also applied to a terminal board which is not shown in order to segregate the two groups of inputs. The interconnections in FIGS. 3A and 3B are rather involved, and not all of them will be described.

As indicated, there are two sets of inputs to the comparator 18; one of these sets 60 is connected to the outputs of the range counter 14, and the other of these sets 70 is connected to the outputs of the shift register 17. Each set of inputs of the comparator shown in FIGS. 3A and 3B comprises sixteen input terminals of which 12 are used. The 12 inputs from the shift register 17 are designated by the reference character 125. As indicated above, this is a standard comparator using standard electronic components and was designed to be used with 16-bit words. It is less expensive to waste four pairs of inputs and their components than it is to design and build a special comparator having only twelve inputs. One input terminal from the set of input terminals 60 is applied as one input to the NAND gate 81, and the corresponding input terminal from the set of inputs 70 is connected to the other input of the NAND gate 81. A second terminal from the set 60 and a second terminal from the set 70 are each connected as separate inputs to the NAND gate 82; a third terminal from the set 60 and a third terminal from the set 70 are connected as separate inputs to the NAND gate 83; and a fourth terminal from the set 60 and a corresponding fourth terminal from the set 70 are connected as separate inputs to the NAND gate 84. The output of the gate 81 is applied as one input to each of the AND gates 85 and 86, and the other input to the gate 85 is connected to the first input terminal of the set 60. The other input to the gate 86 is connected to the first input terminal of the set 70. The output of the gate 82 is connected as one input to each of the AND gates 87 and 88, and the other input to the gate 87 is connected to the second input from the set 60. The other input to the gate 88 is connected to the second terminal of the set 70. The outputs from the two gates 85 and 86 are connected to separate inputs of the NOR gate 91, and the two outputs from the gate 87 and 88 are connected as two separate inputs to the NOR gate 92. Each of the components 65–73 comprises the four AND gates and the two NOR gates such as are shown in the component 65. Therefore, each of these components 65–73 has the eight inputs connected to the outputs of the corresponding components 61–64 and two outputs which come from the gates such as 91 and 92. The output from the gate 91 and the output from the gate 92 are applied as two inputs to a four input gate 93, the other two inputs of the coincidence gate 93 come from the two outputs of the component 66. In a similar manner, the outputs from the two components 67 and 68 are applied as inputs to the AND gate 94, the outputs from the components 69 and 71 are applied as inputs to the AND gate 99 and the outputs of component 72 and 73 are connected as inputs to the AND gate 101. The outputs from the AND gates 93 and 94 are connected as two inputs to a coincidence gate 95, and the outputs from the two gates 99 and 101 are connected as two inputs to the coincidence gate 97. The output from the gate 95 and the output from the gate 97 are connected as two inputs to the coincidence gate 96.

The comparator of FIGS. 3A and 3B receives the information representative of the range of a target from the shift register 17 and information which represents range from the range counter 14. when the simulated radar pulse is transmitted by the antenna simulator 11, the range counter 14 begins counting the timing pulses generated by the clock 15. At any time, the range counter 14 indicates by the value of its contents the range of any target which is displayed. In a sense, the range counter value at any instant is an indication of the distance along a bearing of the sweep of the cathode beam in the radar display tube. The 12 binary digits from the range counter 14 are applied to a set of input terminals 60, and the twelve digits from the shift register 17 are applied to a second set of input terminals 70. Individually, corresponding terminals from each of the sets 60 and 70 are connected to the inputs of each of the gates in the groups 61, 62, 63, and 64 so that each gate has one input connected to a terminal in the set 60 and to the corresponding one in the set 70. For example, the two input terminals for the $2^0$ digits are connected to the inputs of the gate 81, the two input terminals for the $2^1$ digits are connected to the gate 82, etc. Assume for this discussion that $2^0$ digit from the range counter 14 is a zero, the $2^0$ digit from the shift register 17 is a one, the $2^1$ digit from the range counter 14 is a one, and the $2^1$ digit from the shift register 17 is a one. Gate 81 has a one and a zero applied to it, and its output is high. Gate 82 has two ones applied to it and its output is low. The high output from the gate 81 is applied to one of the inputs of the two gates 85 and 86. The other input to the gate 85 is the $2^0$ from the counter 14 which is zero (low). The other input to the gate 86 is the $2^0$ input from the register 17 which is one (high). The low output from the gate 82 is applied to an input of each of the gates 87 and 88, and the other input to the gate 87 is the high $2^1$ digit from the counter 14 while the other input to the gate 88 is the high $2^1$ digit from the shift register 16. When the two inputs to each of the gates 85-88 are high, the output is low, but if either of the inputs is low, the output is high. Therefore, the outputs from the gates 85, 87, and 88 are low, but the output from the gate 86 is high. The two gates 91 and 92 are NOR gates, and any high input to the NOR gates produces a low on the output. Therefore, the output from the gate 91 is low and the output from the gate 92 is high. This procedure is repeated for all of the gates in the groups 61–64 and in the groups 65–73. The outputs from these gates are then applied to the inputs of the AND gates 93, 94, 99, and 101, and the outputs from those gates are applied to the inputs of AND gates 95 and 97. The outputs from the gates 95 and 97 are combined in gate 96 to produce the final output of the system.

The cascaded separate comparators of FIGS. 3A and 3B are required for two reasons. when the original inputs from the terminals sets 60 and 70 are individually combined in the gates 61–64, there are four possible combinations. Of these four combinations of input signals, two combinations occur when the inputs are the same, but only one such combination produces a unique response. Therefore, two steps are required to indicate that any particular pair of input signals of the same number order are identical. In addition, there are twelve pairs of input signals which are tested for correspondence, and but a single output signal is required. To accomplish this, the results of one stage of comparison are combined in a following stage until a single output indicates that all of the inputs from one source are, or are not, the same as all of the inputs from the other source.

Figure 4:
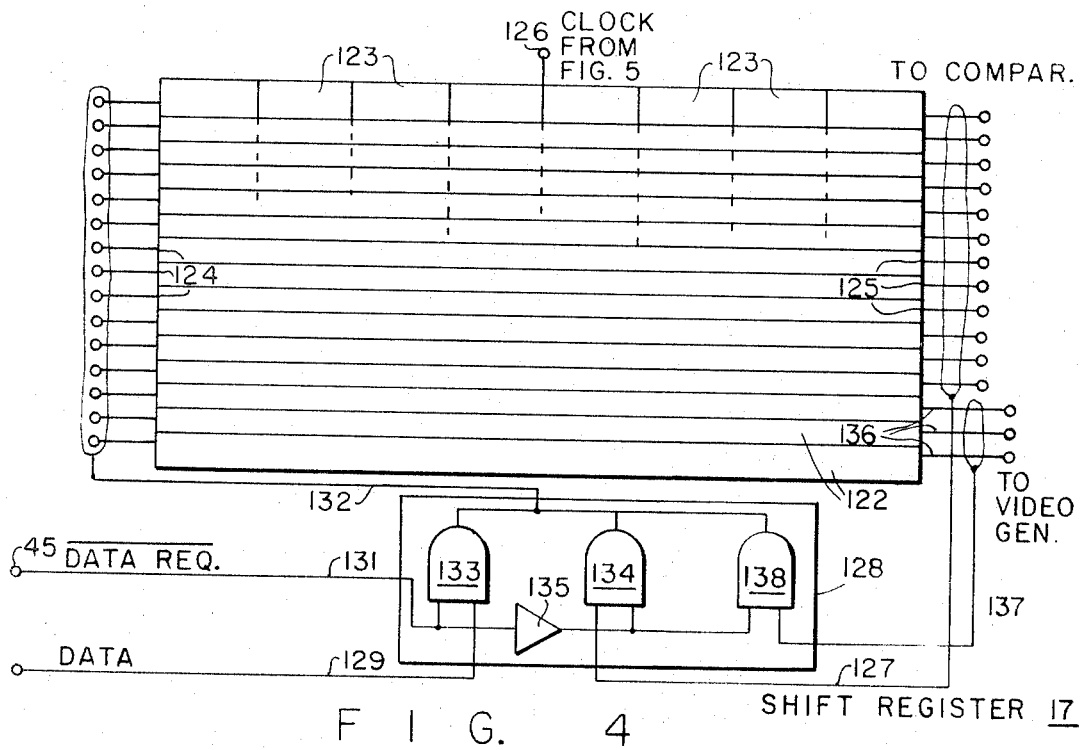
FIG. 4 is a logical block diagram of the shift register of FIG. 1.

The shift register 17 is shown in FIG. 4, and comprises a plurality of registers 122, each of which has a capacity of eight digits 123. The fifteen registers 122 are arranged in parallel so that fifteen digits which represent one target are applied in parallel by input lines 124 to the first stage 123 of all of the registers 122. The last stages 123 of all of the registers 122 are also arranged in parallel, and the contents of the last stages 123 appear on the lines 125. As indicated in FIG. 4, twelve lines 125 are connected to the comparator 18, and the remaining three lines 136 are connected to the video generator 19. In addition, the lines 125 are connected in parallel through a cable designated 127 and the lines 136 are connected in parallel through the cable 137 to the inputs of gates 128. The outputs of the gates 128 are connected in parallel to the input lines 124 through a cable designated 132. In addition, another data input to the gates 128 comes from the computer 13 through a cable 129. Actually, there are three sets of gates 128: one set 133 with inputs from computer 13, another set 134 with inputs from the lines 125, and a third set 138 with inputs from the lines 136. The Data Request signal is applied from the computer 13 to the input terminal 45 which is connected directly to the inputs of the gates 133 and through an inverter to the gates 134 and 138. An input terminal 126 is connected to the clock output of the target shift clock, shown in FIG. 5.

In operation, when the $\overline{\text{Data Request}}$ signal is present on terminal 45, the gates 133, which receive information from the computer along line 129, are enabled, and information from the computer 13 is applied to the terminals 124. This information comprises fifteen binary bits which represent a target range and an intensity. When the next clock pulse appears on the terminal 126 from the shift register clock 16 the information on the terminals 124 is entered into the first stage 123 of the registers 122. The information representing the next target then appears on the terminals 124, and the next clock pulse on the terminal 126 shifts the first word from the first stage 123 to the second stage, and, at the same time, enters the second word into the first stage 123. This continues for eight clock pulse times, when the $\overline{\text{Data Request}}$ signal disappears. Should information representing less than eight targets be applied to the terminals 124, zeros are automatically entered into the three bottom register stages 122 and the maximum range of the system into the other 12 register states 122 by the computer 13 so that the information is shifted to the correct positions, but no targets will be displayed. Therefore, the register 121 is always filled by the computer 13. When the $\overline{\text{Data Request}}$ signal is terminated, the inverter 135 places a high signal on one input to all of the gates 134 and 138 which receive information from the output of the register through the terminals 125 and 136. In this manner, as a word appears at the terminals 125 and 136 and is used, it is also transferred into the first stages 123 at the same time that the same information is transferred out of the last stages 123 to preserve that information so that the same information can be used over and over until the next $\overline{\text{Data Request}}$ signal is applied to the terminal 45. This operation is repeated for each new bearing position of the antenna 11 and for each new beam sweep of the radar display.

Figure 5:
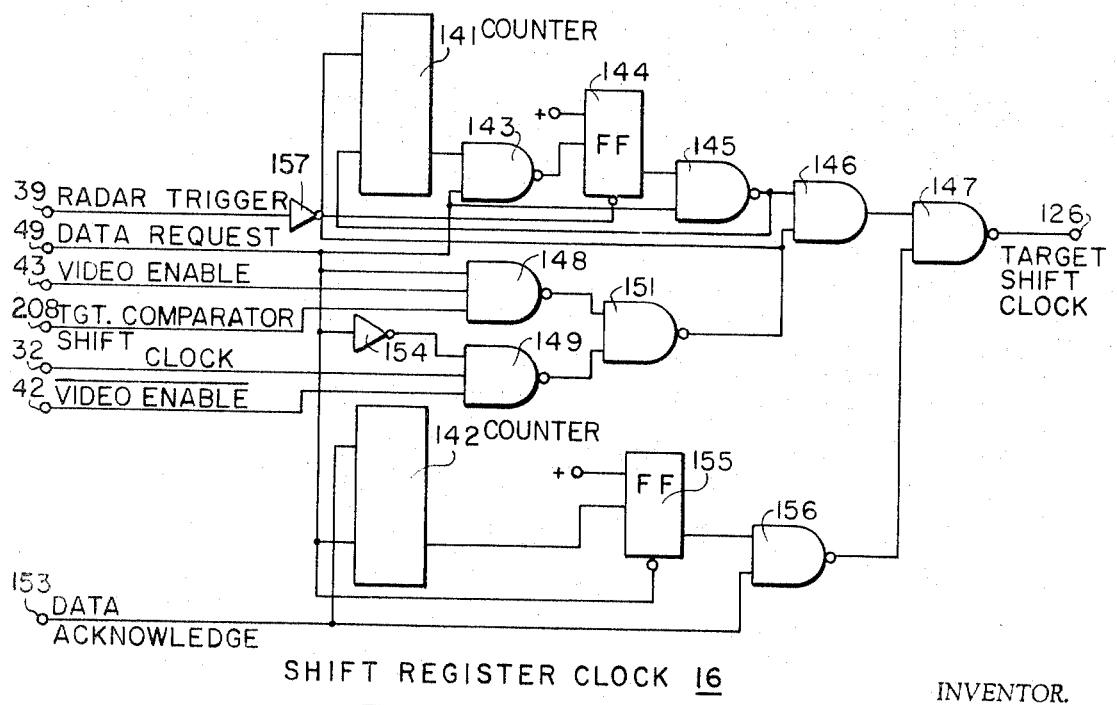
FIG. 5 is a logical block diagram of the shift register clock of FIG. 1.

The target shift clock is shown in FIG. 5 and comprises a three position binary counter 141. The high count of the counter 141 is connected as one input to a NAND gate 143, the other input of which is connected to the input terminal 44 which receives the Data Request signal from the corresponding output terminal of the control circuits 24 shown in FIG. 2. The output from the NAND gate 143 is applied as a clock signal to a flip-flop 144, whose set input has a positive potential permanently applied to it and whose restore input is connected to the RADAR TRIGGER input terminal 39 through an inverter 157. The restore output of the flip-flop 144 is connected to one input of a NAND gate 145, the other input of which is also connected to the data request input 44. The output of the gate 145 is connected to one input of an AND gate 146, whose output is applied as one input to a NAND gate 147. The output of the gate 147 is the target shift register signal which is applied to the input 126 of the shift register shown in FIG. 4. The Data Request input terminal 44 is also connected through the inverter 154 as one input to a NAND gate 148 and through an invertor 154 to a NAND gate 149. A second input to the gate 148 comes from the Video Enable input terminal 43, which is connected to the corresponding output terminal on the control circuits 24 shown in FIG. 2. The third input to the gate 148 comes from the Target Comparator Shift terminal 208 which carries the output of the video generator select 19 shown in FIG. 6. The output of the gate 148 is applied as one input to a NAND gate 151. A second input to the gate 149 comes from the terminal 32 which is connected to the output of the clock 15, and the third input to the gate 149 is connected to the terminal 42, the $\overline{\text{Video Enable}}$ terminal from the control circuits of FIG. 2. The output from the gate 149 is applied as the second input to the gate 151, the output from which is applied as the count input to the counter 141 and also as a second input to the gate 146. The clear input to the counter 141 is connected to the output of the gate 145. The Data Acknowledge terminal 153, is connected as one input to a NAND gate 156, whose second input is connected to the restore output of flip-flop 155. The restore input of the flip-flop 155 is connected to the Data Request terminal 44. The output from the gate 156 is connected as the second input to the gate 147. Also, as shown in FIG. 5 the terminal 153 is connected to the count input of a three position binary counter 142 whose count output is applied to the trigger input of the flip-flop 155.

As described above in connection with the description of FIG. 4, the shift register 121 has a capacity of eight, fifteen-bit words. The words are generated by the computer 13, and immediately after each word is transmitted to the register 17, the computer 13 generates the Data Acknowledge pulse. The Data Request pulse which is applied to the terminal 145 of the shift register 17 exists for the entire time that the register 17 is being loaded, whereas after the computer loads a word into the register 17, it transmits a DATA ACKNOWLEDGE pulse to the terminal 153. The words are loaded into the front end of the register 17 in parallel, and each of the Data Acknowledge pulses which is applied to the gates 133 causes the words to be inserted into the register 17. The Data Acknowledge pulse is applied by the computer 13 to the terminal 153 and to one input of the gate 156. The Data Acknowledge pulses are counted by the counter 142 which generates an output signal to set the flip-flop 155 after eight counts. When both inputs to the gate 156 are high, its output is low. This output is applied as one input to gate 147 which also has a low output only when both of its inputs are high. Therefore, the output from the gate 156 is high except when the flip-flop is set. This causes the Data Acknowledge pulses to pass to the input of gate 147. When gate 147 is closed, its output goes high, and applies a clock pulse to the input terminal 126 of the register 17 to cause the register to shift the words it contains to the next word position. Thus, the $\overline{\text{Data Request}}$ pulse, which is generated by the computer 13 immediately before it transmits a word to the gates 133, causes the register stages to and apply the word to the first word position of the register 17. Since the capacity of the register 17 is eight words, only eight Data Request pulses are generated by the computer 13. This loads the register 17 to capacity.

Once the register 17 has been loaded, there are two conditions under which the target shift clock pulse is applied to the input terminal 126 to shift the contents of the register 17. Once of these is when the word in the last position 123 in the register 17 has been displayed to make the next word available for display. When the target comparator 18, shown in FIG. 1, generates an output signal, it applies that signal to the target video select circuit 19 which generates two output signals. One output signal instructs the target video generator 21 to generate both video information with the intensity portion of the word which is applied to the output terminals 136 of the register 17 and a second signal, the Comparator Shift signal, which is applied to the input 208 of the shift register clock shown in FIG. 5. The Radar Trigger signal which is applied to the terminal 39, as mentioned earlier, is generated by the computer 13 to simulate the generation of the original radar pulse for each sweep. This signal through the inverter 157, clears the flip-flop 144 to its restore condition at the beginning of each sweep and passes a high signal on to one input of the gate 145. The Data Request signal, as mentioned before, is generated when the target information is transferred from the computer 13 to the register 17. This Data Request signal is also applied to the second input of the gate 145. When both inputs to the gate 145 are high, the output from the gate 145 goes low and inhibits the gate 146. Therefore, during the time that the Data Request signal exists, gate 146 is closed. The Data Request signal is also applied as one input to the gates 148 and 149. The Video Enable signal generated by the target counter 14 is applied to the gate 148 together with the Comparator Shift signal. When the three inputs to the gate 148 are high, its output is low and the gate 151 is inhibited. This produces a high output from the gate 151 which is applied to the counter 141 and is counted therein and also is applied to one input to the gate 146. Any time both inputs to the gate 146 are high, its output is high and this produces a low output from the gate 147. Once the Data Request signal expires, the output from the gate 145 remains high. Thereafter, the high output from the gate 146 depends upon the output from the gate 151. While the Data Request signal exists, gate 148 can be opened. When the Data Request expires, the gate 149 can be opened. The Data Request signal exists only when information for any sweep is being generated by the computer 13 for loading into the register 17. Thereafter, the inverter 154 applies a high signal to the gate 149. Whenever the $\overline{\text{Video Enable}}$ signal and the clock pulses are both high, the output of gate 149 goes low. When the output of gate 149 is low, gate 151 is inhibited, and its output is high. The output of gate 149 goes low and high with the input clock pulses applied to the terminal 32. Thus, the gate 146 is opened and closed by the clock pulses, and the output of the gate 147 also goes up and down with the clock pulses. The Video Enable signal is applied to the gate 148 and the $\overline{\text{Video Enable}}$ signal is applied to the gate 149. The gate 148 and the gate 149 open and close alternately with the application of the Video Enable or the $\overline{\text{Video Enable}}$ signal.

The video generator select circuit is shown in block form in FIG. 6. This circuit serves to indicate to the video generator when and for how long the video generator should develop video signals representative of radar targets for display. In addition, the video generator select circuit controls the generation of video signals where two or more targets are too close together to be displayed in the normal manner. In many radar systems, at lest two radar pulse repetition rates are available. The simulation of such systems should also include provision for simulating the several repetition rates. This specification has been limited to a single repetition rate since the provision of more than one pulse rate does not change the principles of the system. In the case where several pulse rates are to be simulated, gates are provided to select one of several pulse times, or conduction paths, or the like. The video generator select circuit has provision for selecting the time durations that the video display exists for the targets. Input terminals 171 and 172 are adapted to be connected to the computer 13 for receiving information relating to the time duration of individual targets or may be connected as shown in FIG. 6 with a positive potential applied to terminal 171 and a negative potential applied to terminal 172. The terminal 171 is directly connected to one input of NAND gate 184 and NAND gate 188, and through an inverter 175 to NAND gates 183 and 187. The terminal 172 is directly connected to one input of each of NAND gates 182 and 186, and through an inverter 176 to one input of each of NAND gates 181 and 185. The other input to each of gates 181, 182, 183, and 184 is connected to the set output of a flip-flop 193, and the other input to each of the gates 185, 186, 187, and 188 is connected to the set output of a flip-flop 194. The output from the gate 181 is connected to the clear input of a binary counter stage 177; the output from the gate 182 is connected to the preset input of the counter stage 177; the output of the gate 183 is connected to the clear input of a binary counter stage 178; and the output of the gate 184 is connected to the preset input of the counter stage 178. Similarly, the output of the gate 185 is connected to the clear input of a binary counter stage 179; the output of the gate 186 is connected to the preset input to the counter stage 179; the output of the gate 187 is connected to the clear input to the binary counter stage 180; and the output from the gate 188 is connected to the preset input of the counter stage 180. The one and zero inputs of the counter stages 177 and 179 have positive potentials applied to them, whereas the one and zero inputs to the counter stage 178 are connected to the zero output of the stage 177, and the one and zero inputs to the stage 180 are connected to the zero output of the counter stage 179. A terminal 173 is adapted to be connected to the clock 15 and is connected through an inverter 174 to one input to each of NAND gates 191 and 192. Another input to the gate 191 is connected to the zero output of the counter stage 177, and the third input to the gate 191 is connected to the zero output of the counter stage 178. The second input to the gate 192 is connected to the zero output of the counter stage 179, and the third input to the gate 192 is connected to the zero output of the counter stage 180. The output of the gate 191 is connected to the clear input of a flip-flop 195, and the output from the gate 192 is connected to the clear input of a flip-flop 196. The set inputs to the flip-flops 195 and 196 have positive potentials applied to them, and the restore inputs to the flip-flops 195 and 196 have negative potentials applied to them. The clock input to the flip-flop 195 is connected to the set output of the flip-flop 193, and the clock input to the flip-flop 196 is connected to the set output of the flip-flop 194. The set inputs to the flip-flops 193 and 194 have positive potentials applied to them, and the restore inputs to the flip-flops 193 and 194 have negative potentials applied to them. The set output from the flip-flop 195 is applied as an input to a NAND gate 202, as an input to a NAND gate 203, and to terminal 211 as the video enable 1 signal. The restore output from the flip-flop 195 is applied a a clock input to a flip-flop 197 and as one input to a NAND gate 201. The clock input terminal 173 is connected to another input to the gate 202, and to the clock inputs of flip-flops 204 and 206. The third input to the gate 202 is connected to the comparator signal input terminal 98 which is also connected to the other input to the gate 201. The output of the gate 201 is connected to the clock input of the flip-flop 193, and the output of the gate 202 is connected to the clock input of the flip-flop 194. The restore output of the flip-flop 193 is connected to the clear input of a flip-flop 204, and the restore output of the flip-flop 194 is connected to the clear input of the flip-flop 206. The set output of the flip-flop 196 is connected to one input of a NAND gate 207 and is connected to the video enable terminal 209. The restore output of the flip-flop 196 is connected to the clock input of the flip-flop 198. The set inputs of the flip-flops 197 and 198 have positive potentials connected to them, and the restore inputs of the flip-flops 197 and 198 have negative potentials connected to them. The restore output of the flip-flop 197 is connected to one input of a NAND gate 205, and the restore output of the flip-flop 198 is connected to the other input to the gate 205. The output of the gate 205 is connected to output terminal 208 which is the range comparator shift terminal. The other input to the gate 203 is connected to the set output of the flip-flop 204, and its output is connected to the clock inputs to the counter stages 177 and 178. The other input to the gate 207 is connected to the set output of the flip-flop 206, and its output is connected to the clock inputs to the counter stages 179 and 180. The set and the restore inputs to the flip-flops 204 and 206 have positive potentials applied to them. Flip-flops 193, 194, 197 and 198 have their clear inputs connected to the clock terminal 173.

As mentioned above, the video generator select circuit 19 performs a combination of functions. The length of time that the target image is displayed is determined by this circuit. The counter stages 177 and 178 comprise a countdown counter, and the binary stages 179 and 180 comprise another countdown counter. Information supplied from the computer 13 is applied to the terminals 171 and 172 to preset the counters in accordance with the type of radar pulse being transmitted, (or, as shown, the counters are preset by the voltages applied thereto) and the subsequent count determines how long the target will be displayed. Assume that the radar system being simulated includes two different radar pulse repetition rates. For the lower rate, the radar pulses last longer than for the higher repetition rate. Therefore, the target exists longer on the display at the lower rate. The computer 13 is programmed with two different quantities, one representing each of the repetition rates. When one mode is requested, one of the quantities is transmitted by the computer to the terminals 171 and 172, and when the other mode is called for, the other quantity is transmitted. For this purpose, the computer could just as well be replaced by any suitable register in which the two quantities are stored. The selected quantities are applied to the terminals 171 and 172 to load each of the counters 177–178 and 179–180 with a number. As shown, a one is applied to terminal 171, and a zero is applied to terminal 172. Then the counters begin counting. The clock pulses from the clock 15 are applied to the terminal 173 and to the clock inputs of the flip-flops 204 and 206. Each time these flip-flops receive a clock pulse, they change their states, and every other clock pulse results in a signal applied to the gates 203 and 207. Whenever the input to the gates 203 and 207 go low, their outputs go high. This applies clock pulses to the counter stages 177–178 and 179–180. Since the counter stages 177–180 are single binary counter stages, the inputs to terminals 171 and 172 from the computer 13 set the counter stages to either their one or their zero conditions. A low clock signal applied to the clear inputs of the flip-flops 193–198 will drive those flip-flops into the restore condition in which the restore output is high. Since the gates 191, 192, 201, 202, 203, 205, and 207 are NAND gates, their outputs will be high except when all of the inputs are high, and then the outputs will be low. The output from the gate 191 is high except when all of the three inputs are high. Therefore, so long as the stage 177 is not zero at the same time that the stage 178 is zero at the same time that a clock pulse occurs, the output from the gate 191 is high. In addition, the circuit of FIG. 6 comprises two separate systems, one system for each of two closely spaced targets. At any one time, only one or the other system will be used. One system comprises counters 177–178, flip-flops 193, 195, 197, and 204, and gates 181–184, 191, 201, and 203. Gate 205 is operated by both systems, and the other system includes the remainder of the components. The two systems are essentially identical, and operate the same.

Assume that all of the counters are at zero and that all of the flip-flops have been restored. When a comparison signal is generated by the comparator 18 and applied to the terminal 98, it applies a high signal to the input of gate 201. Since the flip-flop 195 is restored, the other input to the gate 201 is high and the output of the gate is low. This clocks the flip-flop 193, driving it into its set state. When the restore output of the flip-flop 193 goes low, it clears the flip-flop 204. When the set output of the flip-flop 193 goes high, it opens the gates 181–184 and permits the preset value from the computer 13 to set the counters 177–178. When the contents of the counter 177–178 is other than zero, the output from the gate 191 goes high, removing any clear signal from the flip-flop 195. Immediately after this, the next clock signal clears the flip-flop 193, causing its set output to go low, closing the preset gates 181–184 and clocking the flip-flop 195 to its set state. This supplies one high signal to the input of gate 203 and a high potential to the terminal 211 causing the video generator to generate video information to be displayed. The video generator continues to generate the video information so long as the potential on the terminal 211 is high. When flip-flop 193 was set, it cleared flip-flop 204 so that the clock pulses arriving from the clock 15 cause flip-flop 204 to step. This alternately supplies and removes the second high signal to the input of gate 203, causing the output of the gate 203 to go low and high at one-half the clock rate. The output from the gate 203 causes the counter 177–178 to count-down until it reaches zero. When the counter 177–178 is at zero and the next clock pulse arrives, the output of the gate 191 again goes low, clearing the flip-flop 195 and ending the video generation cycle. When flip-flop 195 is set, two things happen: 1. the potential at the terminal 211 goes high causing the video generator to supply video information to the display, and 2. the flip-flop 197 is set, providing the input to gate 205 with a low input signal. So long as the other system is not required, the other input to the gate 205 remains high, and the output at the terminal 208 is high. The flip-flop 197 is restored by the next clock pulse, causing terminal 208 to go low and indicating to the shift register that the information contained therein should be shifted to the next word. While the first system is in operation, the set output of the flip-flop 195 is high, providing a high signal for one input of gate 202. The repetitive clock pulses provide a second high input, and should the terminal 98 go high, indicating another comparison (a second target to be displayed), a third input to the gate 202 goes high, driving its output low. This clocks the flip-flop 194 to its set state, initiating the operation of the second system. Gate 201 is inhibited from setting flip-flop 193 as long as flip-flop 195 is set, since the restore output of flip-flop 195 is low, thus disabling gate 201. The other system then proceeds to operate as described above, except that the high potential for the video enable appears at the terminal 209 instead of at the terminal 211. The video generator shown in the U. S. Pat. No. 3,514,521 to Burchard et al. has two inputs for switching in one or the other of the two own ships. The signals from the terminals 209 and 211 can be substituted for the switching potentials of the Burchard et al patent to provide operation of the video generator 21.

This specification has described one form of radar simulators where a digital computer is used as a source of information and control signals and wherein the simulator generates mobile targets to be displayed on a standard radar screen. The target generator of this invention can readily be used with other target generators which supply the information for displaying the other targets and other types of targets, or the system of this invention may be used alone. In any case, this specification has described a new and improved radar simulator which is very versatile. It is realized that the above description may indicate to others in the art additional ways in which the principles of this invention may be used without departing from its spirit. It is therefore, intended that this invention be limited only by the scope of the appended claims.

What is claimed is:

1. In a radar simulator, simulated radar receiver means including radar display means upon which radar targets are displayed, means for generating electrical signals for application to said display means, a shift register, means for supplying to said shift register a plurality of digital words representative of the range and radar reflectivity intensity of a plurality of radar targets which appear along a determined simulated bearing from the simulated radar receiver means, a counter, means for supplying pulses to said counter to be counted at a rate which is directly proportional to the speed of propagation of a radar pulse so that the contents of said counter at any time represents the distance from the simulated receiver of a target, first means for comparing the contents of said counter with the range information stored in said shift register, means connecting said comparing means with said generating means for causing said generating means to generate signals to be displayed when said comparing means obtains a direct comparison, and means responsive to said direct comparison for shifting the contents of said shift register to bring the next target information into operative position.

2. The simulator defined in claim 1 wherein said display means comprises a standard radar set.

3. The simulator defined in claim 1 further including means for storing information in digital form representative of the range and bearing of radar targets from said simulated receiver, a simulated radar antenna, second means for comparing the simulated bearing of said simulated antenna with the bearing of the stored target information, and means for transferring information representative of targets from said storage means to said shift register when said second comparing means recognizes a direct comparison between the bearing of said simulated antenna and the bearing of stored target information.

4. The simulator defined in claim 3 wherein said information stored in said shift register comprises a first part which defines the radar reflectivity of said target and a second part which defines the range from said receiver of said target, means for applying said first part to said signal generating means to control the amplitude of the signals generated thereby, and means for applying said second part to said range comparison means.

5. A radar simulator comprising a simulated radar receiver including a simulated radar antenna, means for storing digital information defining the range and bearing of a plurality of radar targets, first comparing means for comparing the position of the simulated antenna with the bearing of said targets and for generating an output signal when a direct comparison is made, a shift register, means responsive to the output from said first comparing means for transferring the digital information representing those targets which lie on the bearing of said radar antenna to said shift register, a digital counter, means for producing pulses to be counted by said counter at a rate which is proportional to the transmission rate of radar signals so that said counter contents represents the range of a radar pulse at any instant, radar display means, second comparing means for comparing the range information contained in said shift register with the contents of said counter and for generating a second output signal when a direct comparison is made, and means responsive to the generation of said second output signal for generating electrical signals to drive said radar display to display the targets whose information is stored in said shift register.

6. The simulator defined in claim 6 further including means responsive to said second output signal for causing the contents of said shift register to shift so as to expose the next target information for comparison.

7. The simulator defined in claim 6 wherein the digital information stored in said shift register further includes information defining the radar reflectivity intensity of each of said targets, and means for applying said intensity information to said generating means when a second comparison is made.

8. The simulator defined in claim 7 further including means for feeding back into the input of said shift register information transferred out of the operative position of said register so that the information contained in said register is recirculated, and means for periodically updating the contents of said shift register.

* * * * *

UNITED STATES PATENT OFFICE
CERTIFICATE OF CORRECTION

Patent No. 3,783,172          Dated January 1, 1974

Inventor(s) Frank H. Bernstein

It is certified that error appears in the above-identified patent and that said Letters Patent are hereby corrected as shown below:

Column 1, line 52, "ws" should be --was--;
    Column 2, line 10, "inter change" should be --interchange--;
               line 13, "ulator" should be --ulators--;
    Column 3, line 38, "in" should be --is--;
    Column 4, line 30 "efines" should be --defines--;
    Column 5, line 13, "when" should be --When--;
    Column 6, line 15, "infomration" should be --information--;
    Column 7, line 31, "is" should be --its--;
    Column 8, line 51 "cmparator" should be --comparator--;
    Column 10, line 35 "when" should be --When--;
    Column 11, line 6, "Data Request" should be --DATA REQUEST--;
    Column 11, lines 53/54 "Data Request" should be --DATA REQUEST--;
    Column 12, line 1, "Data Request" should be --DATA REQUEST--;
               line 2, "through the inverter 154" should be deleted;

line 16, after "circuits" insert --24--;
    Column 13, line 4, "once" should be --one--;
    Column 14, line 3, "lest" should be --least--; and
    Column 15, line 7, "a a" should be --as a--.

Signed and sealed this 23rd day of July 1974.

(SEAL)
Attest:

McCOY M. GIBSON, JR.          C. MARSHALL DANN
Attesting Officer              Commissioner of Patents